(No Model.)
C. M. BUSH.
ELECTRICALLY OPERATED MEANS FOR CONTROLLING VALVES.
No. 558,256. Patented Apr. 14, 1896.
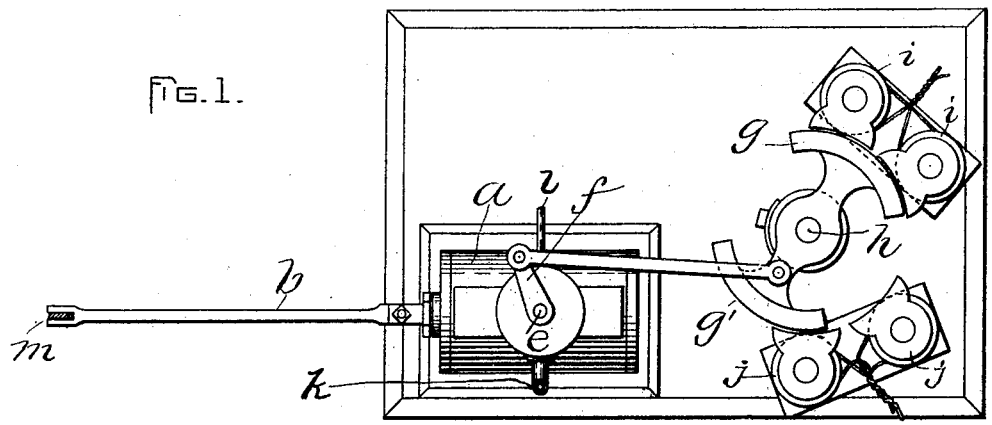
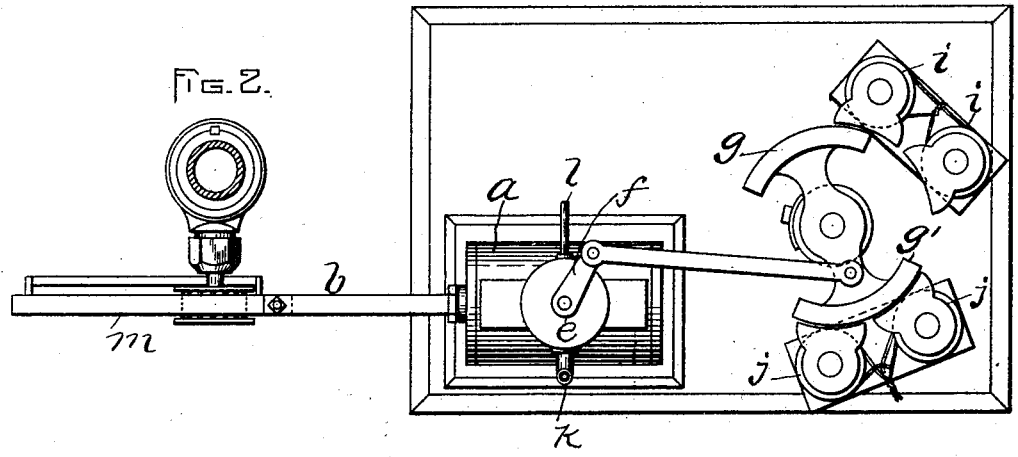
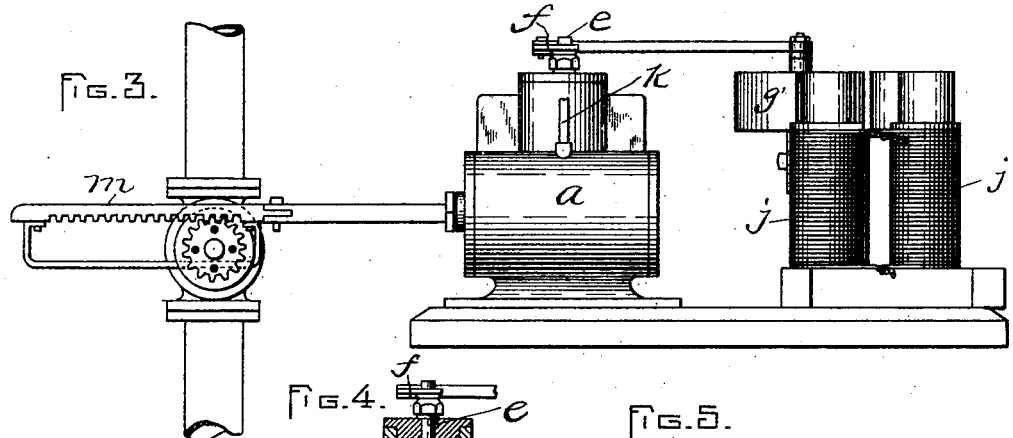
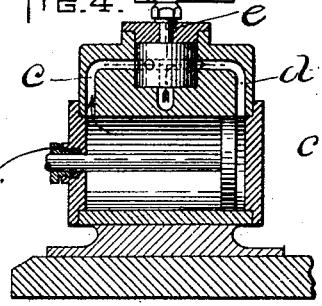
WITNESSES:
INVENTOR:
C. M. Bush.

United States Patent Office.

CHARLES M. BUSH, OF BRISTOL, CONNECTICUT.

ELECTRICALLY-OPERATED MEANS FOR CONTROLLING VALVES.

SPECIFICATION forming part of Letters Patent No. 558,256, dated April 14, 1896.

Application filed January 24, 1895. Serial No. 536,155. (No model.)

*To all whom it may concern:*

Be it known that I, CHARLES M. BUSH, of Bristol, in the county of Hartford and State of Connecticut, have invented certain new and useful Improvements in Electrically-Operated Means for Controlling Valves, of which the following is a specification.

This invention has relation to electrically-operated means whereby power may be turned on or off for the purpose of starting or stopping mechanism for any particular purpose.

It is the object of the invention to provide electrically-actuated contrivances which will operate to open and close or reverse the position of a valve in a steam-cylinder, air-chamber, or the like, and so turn on and shut off power so controlled as to move devices in a desired way to effect a certain result.

To these ends the invention consists of a double magnet, which may be either a polarized magnet or two straight magnets, with reciprocatory or oscillatory armatures constructed and arranged to operate in connection with the said magnets, in combination with means connecting the armatures with a valve-controlling device in such manner that as the armatures are moved in one direction or the other they will open or close a valve or operate a valve to open one port and close another, and so stop or start machinery or alarming devices.

The invention will first be described in detail and in connection with one form of means embodying the same, and then be pointed out with particularity in the claims, in view of any form of means with which the invention may be clothed.

Reference is to be had to the annexed drawings and to the letters marked thereon, forming a part of this specification, the same letters designating the same parts or features, as the case may be, wherever they occur.

Of the drawings, Figure 1 is a plan view of one form of means in which my invention may be embodied. Fig. 2 is likewise a plan view of means embodying the invention, the latter being in this case supposed to be employed to close the valve of a steam-engine to stop the same in case of accident. Fig. 3 is a side elevation of Fig. 2. Fig. 4 is a detail view hereinafter more particularly referred to.

In the drawings, $a$ designates a steam-cylinder or air-chamber provided with a valve, so as to open and close ports in order to allow the steam or air pressure to operate upon a piston in such manner as to move the piston-rod $b$ in one direction or the other, in accordance as to whether pressure were admitted in the front or the rear of the said piston through the ports $c$ or $d$.

$e$ is a spindle constructed and arranged to operate the valve in the steam or air or gas chamber, so as to open or close the ports $c$ or $d$. The upper or outer end of the said spindle $e$ is connected with one end of a crank $f$, the other end of which is pivoted upon a duplex armature $g$ $g'$, adapted to have an oscillatory or a rotary reciprocatory motion upon a pivot or spindle $h$.

$i$ $j$ are electromagnets so arranged as that the field of one shall control the armature $g$ and the other the armature $g'$, the construction being such that when one electromagnet is magnetized and the other demagnetized the armature of the magnetized magnet will be drawn fully within its field and the other will be moved nearly out of the same, and when the electrical conditions are reversed the positions of the armatures will be reversed, and by this action the direction of movement of the crank may be reversed, so as to cause the steam or air pressure to be admitted in front or rear of the piston and effect its movement in one direction or the other and reciprocate the piston-rod $b$ accordingly, as will be readily understood.

$k$ designates the inlet port or pipe for the admission of compressed air or steam, and $l$ is the exhaust port or pipe for the outlet of steam or compressed air behind the piston when the latter is to be reversed.

As before stated, the magnets $i$ $j$ may be two straight magnets or a polarized magnet. In the first instance the operation will be by closing the circuit to one magnet and opening it to the other, and vice versa, and in the second instance the object will be accomplished by a reversal of the current. The oscillation of the armatures simply effects the movement of the valve, and the steam or air pressure on the piston moves the piston-rod so as to effect the desired operation. By this means by merely pressing an electric button a whistle may be blown or a bell rung or other alarm sounded, or machinery may be stopped or started or other results accomplished, as will be understood without further explanation.

In Figs. 2 and 3 of the drawings the piston-rod $b$ is shown as connected with a rack-bar $m$, which meshes with a gear $n$ on a steam-engine valve, so that by the reciprocating movements of the piston-rod the steam may be turned on or shut off to start or stop the engine. Under these circumstances electric push-buttons may be arranged throughout a factory, so that in case of accident to the machinery or an operative by the machinery the engine and machinery can be stopped immediately.

It is obvious that a thermostat may be employed to control the electric current so as to oscillate the armatures, and by this means make the invention applicable to fire-alarm systems, but my improvements are not limited to any particular use or uses.

Having thus explained the nature of the invention and described a way of constructing and using the same, though without attempting to set forth all of the forms in which it may be made or all of the modes of its use, it is declared that what is claimed is—

1. A device of the class described comprising a magnet having its pole-faces arranged in a common plane and longitudinally of its field of force, an oscillatory armature adapted to move in and longitudinally of the field of said magnet, said armature projecting normally into the portion of the field of greatest intensity, and means for transmitting motion from said armature.

2. A device of the class described, comprising a plurality of bipolar-magnets each having its pole-faces arranged in a common plane and longitudinally of its field of force, an oscillatory support intermediate the magnets, an armature for each magnet on said support and arranged to move in and longitudinally of the field of its magnet, said armature projecting normally into the portion of the field of its magnet of greatest intensity and adapted to complete the magnetic circuit, a valve having an oscillatory spindle, a crank on said spindle, and a pitman pivoted to the armature-support and to the said crank for transmitting motion from the former to the latter.

In testimony whereof I have signed my name to this specification, in the presence of two subscribing witnesses, this 18th day of January, A. D. 1895.

CHARLES M. BUSH.

Witnesses:
  ROGER S. NEWELL,
  ALICE E. BROWN.